UNITED STATES PATENT OFFICE.

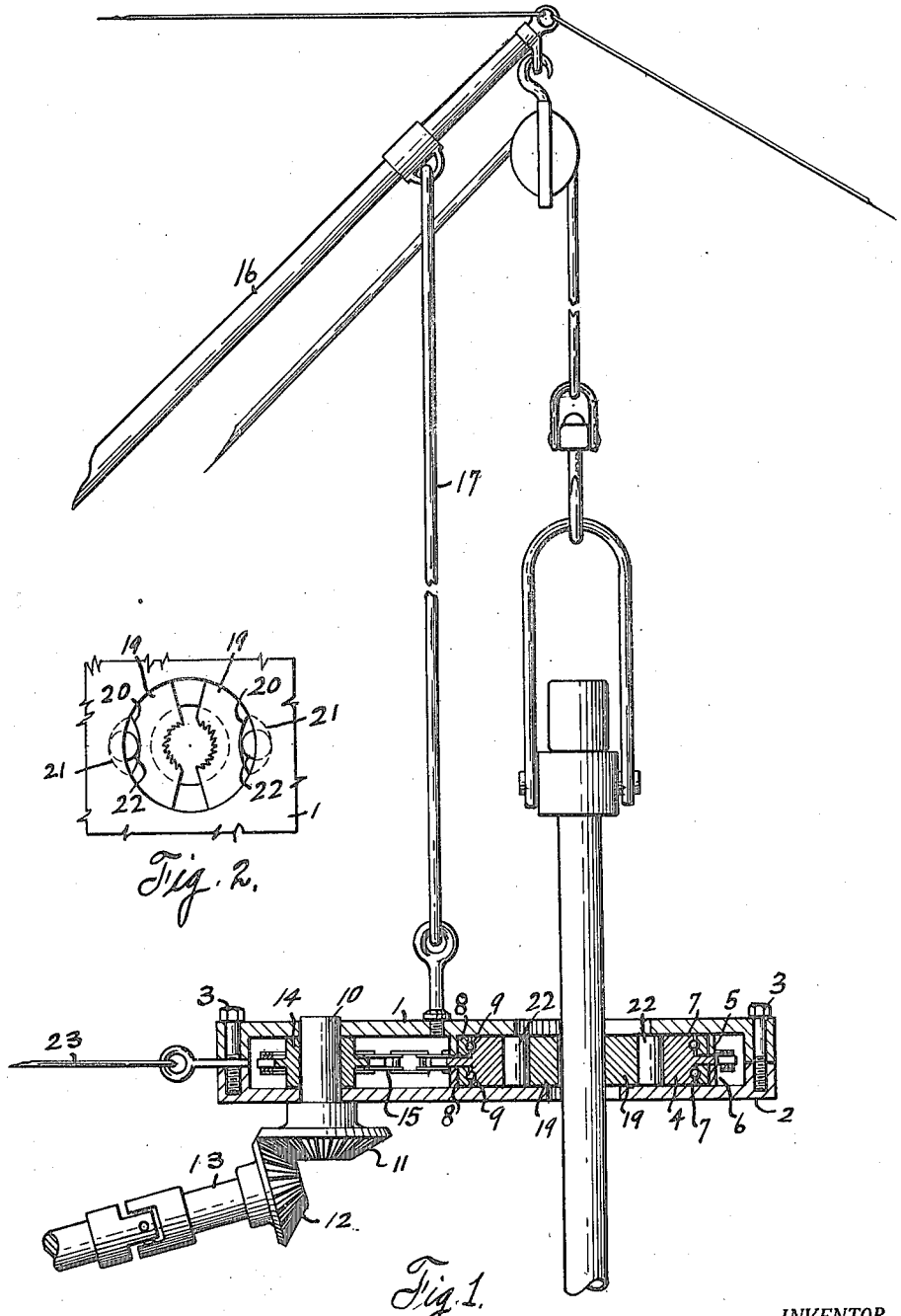

HOMER C. THRIFT, OF BURKBURNETT, TEXAS.

MACHINE FOR SCREWING TOGETHER AND UNSCREWING PIPES AND RODS.

Application filed May 31, 1921. Serial No. 473,892.

*To all whom it may concern:*

Be it known that I, HOMER C. THRIFT, a citizen of the United States, residing at Burkburnett, in the county of Wichita and State of Texas, have invented certain new and useful Improvements in Machines for Screwing Together and Unscrewing Pipes and Rods, of which the following is a specification.

This invention relates to new and useful improvements in a machine for screwing together and unscrewing pipes and rods.

One object of the invention is to provide a machine of the character described which is specially adapted for use in unscrewing the joints of pipe or casing as the same is withdrawn from abandoned wells.

Another object is to provide an inexpensive and simple machine adapted for easy application in the work of withdrawing pipe and casing from abandoned wells where the ordinary appliances, used for unscrewing pipe or casings in well drilling, are not available; however, the machine may be used generally for screwing together or unscrewing joints of rods, pipe or casing.

With the above and other objects in view the invention has particular relation to certain novel features of construction, operation and arrangement of parts, an example of which is given in this specification and illustrated in the accompanying drawings, wherein:

Figure 1 shows a sectional view of the device as applied in unscrewing joints of well pipe or casing, and Figure 2 shows a fragmentary plan view.

Referring now more particularly to the drawings, the numerals 1 and 2 designate the top and bottom plates of the casing which are secured together by means of set bolts 3. These plates have vertically aligned openings, to receive the pipe, and working between the plates there is the ring-like sprocket wheel 4 concentric with said openings. The margins of these plates are inwardly flanged, said flanges abutting as shown to space the plates apart, thus providing a space for the sprocket wheel between them, and the plates have coinciding annular flanges which form bearings 5 and 6 which surround the sprocket wheel 4. The margin of the wheel 4 is shouldered inwardly on each side, forming the grooved shoulders 7, 7 arranged opposite the raceway rings 8, 8, which are seated against the corresponding ribs 5 and 6 of the end plates and anti-friction bearings 9 are seated in said grooves between the shoulders 7 and the rings 8. A stub shaft 10 has bearings in the casing and fixed on its lower end there is a pinion 11 in mesh with a corresponding pinion 12 which is fixed on the flexible drive shaft 13. Fixed on said stub shaft 10 between the end plates 1 and 2 there is a sprocket wheel 14 and operating over the sprocket wheels 4 and 14 and transmitting rotation from the latter to the former there is a sprocket chain 15.

The device is fastened to a supporting mast 16, by means of suitable cables or rods 17, which are attached to the eye-bolts carried by the top plate of the casing. Pipe gripping jaws 19, 19 are arranged on opposite sides of said pipe or casing and rest on the inner margin of the plate 2 as shown in Figure 1. These jaws are arcuate in form and their inner sides are serrated. Their outer sides are formed with arcuate notches or bearings 20 and the inner wall of the sprocket wheel 4 is formed of similar opposing arcuate notches, or bearings 21. A space is thus formed for the reception of roller bearings 22 which cause the jaws to contract around and engage with the upper section of pipe when the sprocket wheel is rotated.

The casing is held against rotation by means of suitable wires 23. The pipe beneath the upper section is held against rotation by any suitable, and well known, means for this purpose and the upper section being turned, as explained, will be unscrewed and may be removed. The pipe is then elevated to bring another section into position to be unscrewed and the process, above explained, is repeated and the string of pipe is thus broken up, joint by joint.

The device may also be used for screwing together and unscrewing joints of pipe and rods whereever located and for any purpose desired.

What I claim is:—

1. A device of the character described, including a casing having an opening to receive a pipe, a ring-like rotary member therein, through which the pipe is adapted to extend, means for rotating said member, pipe engaging jaws carried by the casing, each jaw and the opposing face of said member being formed with arcuate notches, bearings located in the respective notches, through which the jaws are contracted around the pipe when said member is rotated.

2. A device of the character described, including a casing formed of upper and lower plates spaced apart and formed with openings to receive a pipe, a rotary ring-like member within the casing and provided with a central opening, through which the pipe is adapted to pass, means for rotating said member, arcuate pipe gripping jaws seated on the lower plate, and roller bearings interposed between the respective jaws and the rotary member which contract the jaws into engagement with the pipe and also lock them to rotate with said member when the latter is rotated.

3. A device of the character described including a casing having an opening to receive a pipe, a ring-like rotary member therein through which the pipe is adapted to extend, means for rotating said member, a plurality of pipe engaging jaws mounted in the casing, and means through which said jaws are contracted into engagement with the pipe when the rotary member is rotated in either direction.

4. A device of the character described including a casing having an opening to receive the pipe, a ring-like rotary member therein, through which the pipe is adapted to extend, means for rotating said member a plurality of pipe engaging jaws carried by the casing, and means between each jaw and said member, and actuated by the latter as it operates, and operating to contract said jaws into engagement with the pipe, the cooperating parts of said means and jaws being so formed that the jaws will be contracted when said member is rotated in either direction.

5. A device of the character described including a casing having an opening to receive a pipe, a ring-like rotary member therein, through which the pipe is adapted to extend, means for rotating said member, a plurality of pipe engaging jaws mounted within the rotary member, and means interposed between each jaw and said rotary member, and operating to contract the jaws around the pipe when the rotary member is rotated, said means being of such formation that the jaws will be contracted when the rotary member is rotated in either direction.

In testimony whereof I have signed my name to this specification in the presence of two subscribing witnesses.

HOMER C. THRIFT.

Witnesses:
T. H. GRENNELL,
H. G. BURNET.